(12) United States Patent
Yao et al.

(10) Patent No.: US 12,348,658 B2
(45) Date of Patent: Jul. 1, 2025

(54) ELECTRONIC DEVICE

(71) Applicant: Honor Device Co., Ltd., Shenzhen (CN)

(72) Inventors: Wenxing Yao, Shenzhen (CN); Yawei Zhao, Shenzhen (CN); Jiuliang Gao, Shenzhen (CN); Yan Wang, Shenzhen (CN); Kuibing Zhao, Shenzhen (CN); Jingbo Liu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 22 days.

(21) Appl. No.: 17/920,360

(22) PCT Filed: May 18, 2022

(86) PCT No.: PCT/CN2022/093682
§ 371 (c)(1),
(2) Date: Oct. 20, 2022

(87) PCT Pub. No.: WO2023/273677
PCT Pub. Date: Jan. 5, 2023

(65) Prior Publication Data
US 2024/0214481 A1   Jun. 27, 2024

(30) Foreign Application Priority Data

Jul. 2, 2021 (CN) .......................... 202110753742.1

(51) Int. Cl.
*H04W 4/00* (2018.01)
*H04M 1/02* (2006.01)

(52) U.S. Cl.
CPC ....... *H04M 1/0283* (2013.01); *H04M 1/0264* (2013.01)

(58) Field of Classification Search
CPC .... H04M 1/0283; H04M 1/0264; H04M 1/18; H04M 1/185
See application file for complete search history.

(56) References Cited

U.S. PATENT DOCUMENTS

2015/0198864 A1   7/2015   Glenn et al.

FOREIGN PATENT DOCUMENTS

| CN | 107370849 | A |   | 11/2017 |
|----|-----------|---|---|---------|
| CN | 107493358 | A | * | 12/2017 |
| CN | 208353377 | U |   | 1/2019  |
| CN | 110417965 | A |   | 11/2019 |
| CN | 110896419 | A |   | 3/2020  |

(Continued)

*Primary Examiner* — Omoniyi Obayanju
(74) *Attorney, Agent, or Firm* — Slater Matsil, LLP

(57) ABSTRACT

An electronic device comprises a housing and a camera decoration assembly including a first decoration part and a second decoration. The second decoration part sleeves an outer side surface at an end, outside the housing, of the first decoration part, and an outer edge of the second decoration part extends to an outer surface of the housing, such that in addition to a camera decoration assembly having diverse appearance effects, a size of a hole formed in the housing can be decreased to enhance overall strength of the housing. Moreover, a form of connection between a buckle and a connection assembly facilitates disassembly, decreases occupied space, and can increase flexibility in disassembling the camera decoration assembly.

20 Claims, 10 Drawing Sheets

(56) References Cited

FOREIGN PATENT DOCUMENTS

| | | |
|---|---|---|
| CN | 210137346 U | 3/2020 |
| CN | 110958339 A | 4/2020 |
| CN | 111586213 A | 8/2020 |
| CN | 212231510 U | 12/2020 |
| CN | 112437219 A | 3/2021 |
| CN | 112615951 A | 4/2021 |
| CN | 112689038 A | 4/2021 |
| CN | 113726926 A | 11/2021 |

* cited by examiner

ELECTRONIC DEVICE

CROSS-REFERENCE TO RELATED APPLICATIONS

This application is a National Stage of International Application No. PCT/CN2022/093682, filed on May 18, 2022, which claims priority to Chinese Patent Application No. 202110753742.1, filed on Jul. 2, 2021. Both of the aforementioned applications are hereby incorporated by reference in their entireties.

TECHNICAL FIELD

The present application relates to the technical field of electronic devices, and in particular, to an electronic device.

BACKGROUND

With the development of science and technologies, electronic devices have been substantially popularized to people's life. Especially, mobile electronic devices, being convenient to carry and having practical functions, can meet daily living demands of people and develop rapidly. Generally, a common mobile electronic device, for example, a mobile phone or a tablet computer, is equipped with a camera assembly to provide a photographing function. However, with the increase of users requirements on the photographing function and an appearance of the electronic device, the camera assembly and a camera decoration assembly are continuously upgraded.

The following uses an existing mobile phone as an example. With the increase in quantity and size of cameras of the mobile phone, an outline dimension of a camera decoration part becomes increasingly large. Camera decoration parts of some mobile phones are formed by splicing and assembling a plurality of components, thereby having diverse appearance effects and increasing flexibility in assembling the camera decoration parts with battery covers.

However, for an existing camera decoration part that is formed by splicing and assembling a plurality of components, a size of a decoration part hole formed in a battery cover is increased to guarantee an appearance effect of the decoration part. As a result, structural strength of the battery cover is decreased.

SUMMARY

Embodiments of the present application provide an electronic device, to decrease an outline dimension of a decoration part hole formed in a housing and therefore enhance overall strength of the housing while ensuring that a camera decoration assembly has diverse appearance effects. Moreover, the camera decoration assembly has a simple connection form, and occupies less space, thereby increasing flexibility in disassembling the camera decoration assembly and facilitating disassembly and assembly of the camera decoration assembly.

The embodiments of the present application provide an electronic device, at least including: a housing and at least one camera module, where an opening is formed in the housing.

The electronic device further includes a camera decoration assembly, where the camera decoration assembly penetrates the opening, and the camera module is disposed near the camera decoration assembly.

The camera decoration assembly includes a first decoration part, a second decoration part, and at least one connection assembly configured to connect the first decoration part to the second decoration part.

A first end of the first decoration part penetrates the opening and is disposed outside the housing, and a second end of the first decoration part is disposed in the housing and connected to an inner surface of the housing.

The second decoration part sleeves an outer side surface, outside the housing, of the first decoration part, and an outer edge of the second decoration part extends to an outer surface of the housing.

In the electronic device provided in the embodiments of the present disclosure, the second decoration part sleeves an outer side surface at an end, outside the housing, of the first decoration part, and the outer edge of the second decoration part extends to the outer surface of the housing, such that an outline dimension of the opening formed in the housing can be less than that of the camera decoration assembly, thereby enhancing overall strength of the housing. In addition, the first decoration part and the second decoration part may be made of different materials, and have different colors, glyphs, patterns, and the like, thereby enriching an appearance effect of the camera decoration assembly, and increasing overall aesthetics of the electronic device. Moreover, a gap between the camera decoration assembly and the housing can be hidden in appearance, thereby preventing accumulation of dust and increasing overall exquisiteness of the electronic device.

In a possible implementation, an outer surface between the first end and the second end of the first decoration part is provided with a first step, the first step is disposed in the opening, and the second decoration part is partially disposed on and connected to the first step.

In a possible implementation, a surface, facing the first step, of the second decoration part is provided with an extension section, an end of the extension section is provided with a buckle, and a through hole allowing the extension section and the buckle to penetrate is formed in the first step.

The connection assembly is configured to connect to at least the buckle, thereby connecting the second decoration part to the first decoration part.

In a possible implementation, an end surface, in the housing, of the first decoration part is provided with a buckle cavity, the buckle cavity is communicated with the through hole, and the buckle is disposed in the buckle cavity.

In a possible implementation, the connection assembly includes a sealing glue, and the buckle cavity is filled with the sealing glue, and the sealing glue is used to fix the buckle in the buckle cavity.

In a possible implementation, the connection assembly includes a locking structure, an end of the locking structure is provided with a pin, a locking groove is formed between the buckle and an inner wall of the buckle cavity, and the pin is disposed in the locking groove.

In a possible implementation, the connection assembly further includes fixing structures, and the fixing structures are respectively disposed at two ends of the locking structure and are used to clamp the buckle.

In a possible implementation, the electronic device further includes a sealing cover, where the sealing cover covers and seals an opening, facing an interior of the housing, of the buckle cavity.

In a possible implementation, the connection assembly is provided with a reinforcing rib.

In a possible implementation, the second end of the first decoration part is provided with a second step, and a surface, facing the first end of the first decoration part, of the second step is in sealed connection with the housing.

In a possible implementation, a binder is disposed between the second decoration part and the first step, and the binder is also disposed between the second decoration part and the outer side surface at the end, outside the housing, of the first decoration part.

In a possible implementation, the electronic device further includes a lens, and the lens is disposed on a top surface of the first decoration part.

In a possible implementation, a periphery of the top surface of the first decoration part is provided with a convex edge, the convex edge and the top surface of the first decoration part define a mounting cavity, and the mounting cavity is used for mounting of the light-transmitting sheet.

In a possible implementation, a surface, away from an interior of the housing, of the second decoration part is an inclined surface inclined to the housing.

In a possible implementation, a surface, away from an interior of the housing, of the second decoration part is parallel to the outer surface of the housing.

In a possible implementation, the connection assembly includes a screw, the second decoration part is provided with a threaded hole, a through hole is formed in the first step, and the screw penetrates the through hole and is connected to the threaded hole.

The structure of this application and other objectives and beneficial effects thereof will become more comprehensible from the description of the preferred embodiments with reference to the accompanying drawings.

BRIEF DESCRIPTION OF THE DRAWINGS

To describe the technical solutions in this application or the related art more clearly, the following briefly describes the accompanying drawings required for describing the embodiments or the related art. Apparently, the accompanying drawings in the following description show some embodiments of this application, and a person of ordinary skill in the art may derive other drawings from the accompanying drawings without creative efforts.

FIG. 3 is a schematic structural diagram showing cross sections of a camera decoration assembly and a rear cover in direction A-A in FIG. 2a;

Figure 1:
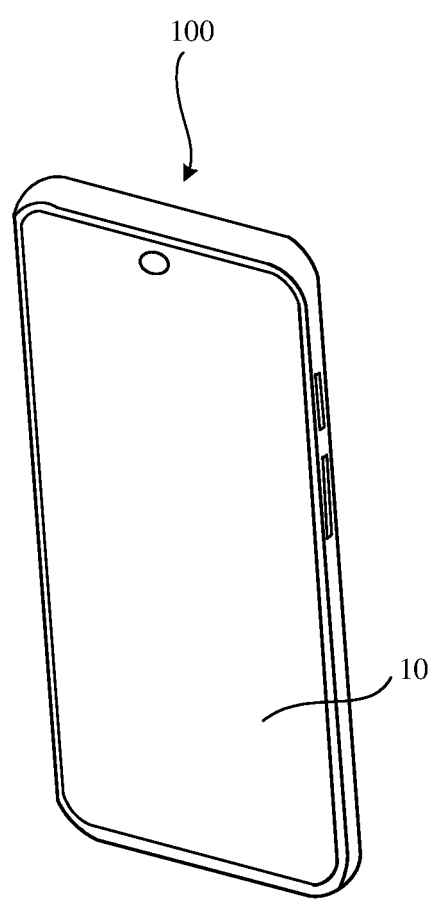
FIG. 1 is a schematic structural diagram of an electronic device according to an embodiment of the present application.

Reference numerals in the accompanying drawings are as follows:

| | |
|---|---|
| 100: electronic device; | 10: display screen; |
| 20: rear cover; | 21: opening; |
| 30: middle frame; | 31: metal middle plate; |
| 32: rim; | 40: circuit board; |
| 50: battery; | 60: camera module; |
| 601: front-facing camera; | 602: rear-facing camera; |
| 70: camera decoration assembly; | 71: photographing hole; |
| 72: first decoration part; | 721: first step; |
| 7211: through hole; | 722: buckle cavity; |
| 7221: locking groove; | 723: sealing cover; |
| 724: convex edge; | 725: mounting cavity; |
| 726: second step; | 727: hanging table; |
| 73: second decoration part; | 731: extension section; |
| 732: buckle; | 733: hanging table; |
| 74: connection assembly; | 741: locking structure; |
| 7411: pin; | 742: fixing structure; |
| 743: reinforcing rib; | 80: light-transmitting sheet; |
| 90: connecting piece; and | 91: binder. |

DETAILED DESCRIPTION OF ILLUSTRATIVE EMBODIMENTS

Terms used in implementations of this application are used to only explain specific embodiments of this application, and are not intended to limit this application. The implementations of the embodiments of this application will be described in detail below with reference to the accompanying drawings.

The embodiments of the present application provide an electronic device that may be, but is not limited to, a mobile phone, a tablet computer, a notebook computer, an ultra-mobile personal computer (Ultra-mobile Personal Computer, UMPC), a handheld computer, an intercom, a netbook, a POS terminal, a personal digital assistant (Personal Digital Assistant, PDA), a drive recorder, a security device, or another mobile or fixed terminal having a photographing function. The embodiments of the present application are described by using a mobile phone as an example.

Figure 2:
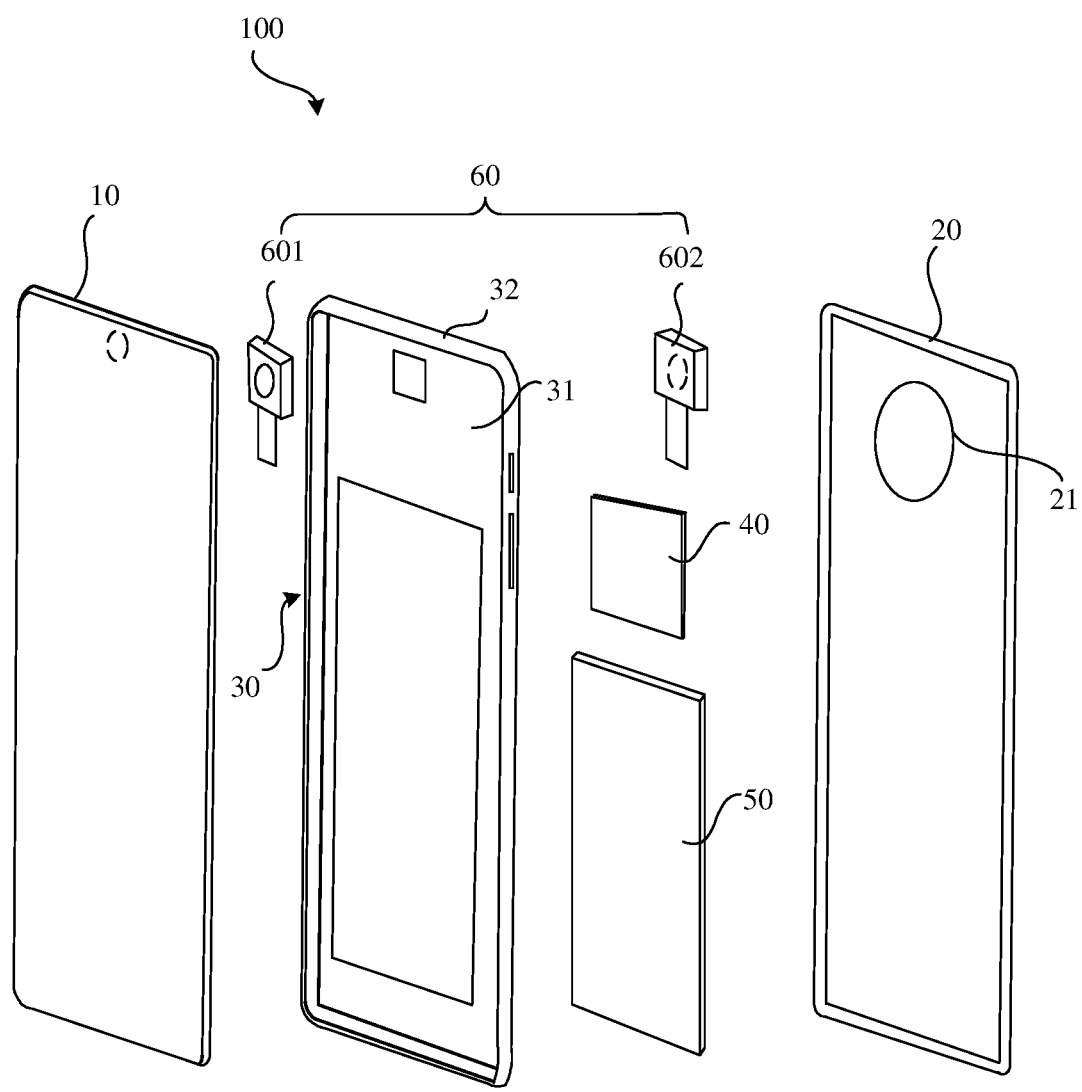
FIG. 2 is a schematic exploded structural diagram of an electronic device according to an embodiment of the present application.

FIG. 1 is a schematic structural diagram of an electronic device according to an embodiment of the present application. FIG. 2 is a schematic exploded structural diagram of an electronic device according to an embodiment of the present application. Referring to FIG. 1 and FIG. 2, the electronic device 100 provided in the embodiments of the present application may include a housing. The housing may provide a structural frame for the electronic device 100. For example, in FIG. 2, the housing may include a middle frame 30 and a rear cover 20. When the electronic device 100 has a display function, the electronic device 100 may be further provided with a display screen 10. A middle frame 30, a circuit board 40, and a battery 50 are disposed between the display screen 10 and the rear cover 20. The circuit board 40 and the battery 50 may be disposed on the middle frame 30. For example, the circuit board 40 and the battery 50 are disposed on a surface, facing the rear cover 20, of the middle frame 30; or the circuit board 40 and the battery 50 may be disposed on a surface, facing the display screen 10, of the middle frame 30.

It is easily understood that the housing of the electronic device provided in the present application includes, but is not limited to, the above structure. For example, in some other embodiments, the housing may be an integral or split housing made of metal, plastics, or the like. In the embodiments of the present application, the housing is specifically described by using a structure composed of the middle frame 30 and the rear cover 20 as an example.

The battery 50 may be connected to the circuit board 40, to supply power to a processor, an internal memory, an external memory, the display screen 10, a camera module 60, a communications module, and the like.

The display screen 10 may be an organic light-emitting diode (OLED), or a liquid crystal display (LCD).

The rear cover 20 may be made of metal, glass, plastics, or ceramics. A material of the rear cover 20 is not limited in the embodiments of the present application.

The middle frame 30 may include a middle plate 31 and a rim 32. The rim 32 is provided around the outer periphery of the middle plate 31. Generally, the rim 32 may include a top frame, a bottom frame, a left side frame, and a right side frame. The top frame, the bottom frame, the left side frame, and the right side frame form a frame with a square ring structure. The middle plate 31 may be an aluminum plate, an aluminum alloy, or a magnesium alloy. The rim 32 may be made of metal or ceramics. The metal middle plate 31 and the rim 32 may be clamped, welded, or bonded to each other, formed integrally, or fixedly connected via injection molding.

It should be noted that, in some other embodiments, the electronic device 100 may include, but is not limited to, the structures shown in FIG. 1 and FIG. 2. The rear cover 20 of the mobile phone may be connected to the rim 32 to form an integral housing. For example, the electronic device 100 may include the display screen 10, the metal middle plate 31, and a shell. The shell may include the rim 32 and the rear cover 20 that are integrally formed. In this case, the circuit board 40 and the battery 50 are disposed in space enclosed by the metal middle plate 31 and the shell.

In the embodiments of the present application, the electronic device 100 further includes at least one camera module 60 and a flash (not shown in the figure), to implement the photographing function. The camera module 60 may be a front-facing camera 601, a rear-facing camera 602, or the like. There may be one or more front-facing cameras 601 or rear-facing cameras 602. For example, as shown in FIG. 2, in the electronic device 100 provided in the present application, the camera module 60 includes a front-facing camera 601 and a rear-facing camera 602. In the embodiments of the present application, the camera module 60 is described by using the rear-facing camera 602 as an example.

The rear-facing camera 602 and the flash may be disposed on a surface, facing the rear cover 20, of the metal middle plate 31. An opening 21, in which partial areas of the flash and the rear-facing camera 602 can be mounted, is formed in the rear cover 20. The front-facing camera 601 may be disposed on a surface, facing the display screen 10, of the metal middle plate 31. In the embodiments of the present application, disposing locations of the front-facing camera 601 and the rear-facing camera 602 include, but are not limited to, those in the above description. In some embodiments, there may be one or N front-facing cameras 601 and rear-facing cameras 602 in the electronic device 100, and N is a positive integer greater than 1.

It may be understood that the schematic structure in this embodiment of this application constitutes no specific limitation on the electronic device 100. In some other embodiments of this application, the electronic device 100 may include more or fewer components than those shown in the figure, or some components may be combined, or some components may be split, or a different component deployment may be used. The components shown in the figure may be implemented by hardware, software, or a combination of software and hardware.

The camera module 60 may include a lens, a filter, a support, a photosensitive element, a flexible plate, a connector, and the like.

It should be noted that, the camera module 60 may have a focal length or a variable focal length. When the camera module 60 has a variable focal length, the camera module 60 may further include a focusing module (not shown in the figure), for example, a focusing motor. The focusing motor may be disposed on the support of the camera module.

In the embodiments of the present application, the filter may be disposed according to a functional requirement. For example, the filter may be an IR cut filter (IR cut Filter, IRCF). The IR cut filter can filter out infrared light, thereby avoiding an impact on imaging caused by infrared light entering the lens.

The photosensitive element may be a charge coupled device (CCD) or a complementary metal-oxide-semiconductor (CMOS) phototransistor. The connector is configured to electrically connect the flexible plate with an image signal processor (Image Signal Processing, ISP) on the circuit board 40. The image signal processor (ISP) is connected electrically to a digital signal processor (Digital Signal Processing, DSP). The image signal processor (ISP) and the digital signal processor (DSP) may be disposed on the circuit board 40 independently or integrally.

During photographing, a shutter is enabled; light passes through the lens and is transmitted to the photosensitive element through the filter; a light signal is converted into an electrical signal; the photosensitive element transmits the electrical signal to the image signal processor (ISP) through the flexible plate and the connector; the image signal processor (ISP) converts the electrical signal into a digital image signal and outputs the digital image signal to the digital signal processor (DSP); and the digital signal processor (DSP) converts the digital image signal into an image signal in a standard format such as RGB or YUV.

Figure 2A:
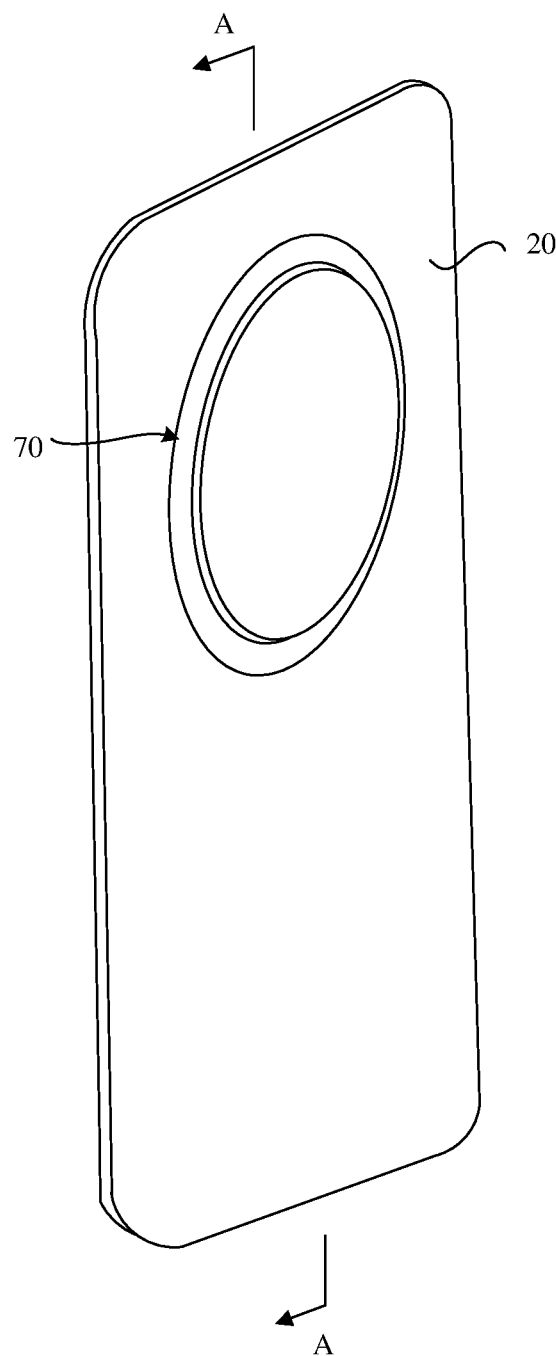
FIG. 2a is a schematic diagram of a rear cover of an electronic device according to an embodiment of the present application.

FIG. 2a is a schematic diagram of a rear cover of an electronic device according to an embodiment of the present application. As shown in FIG. 2a, to guarantee aesthetics of the device and meet a mounting requirement, a camera decoration assembly 70 is generally disposed in the opening 21 in the rear cover 20 when the rear-facing camera 602 is disposed on the rear cover 20 of the electronic device 100. The camera decoration assembly 70 may be formed by splicing and assembling a plurality of components, such that the camera decoration assembly 70 has diverse appearance effects, and flexibility in assembling the camera decoration assembly 70 with the rear cover 20 is increased.

Figure 3:
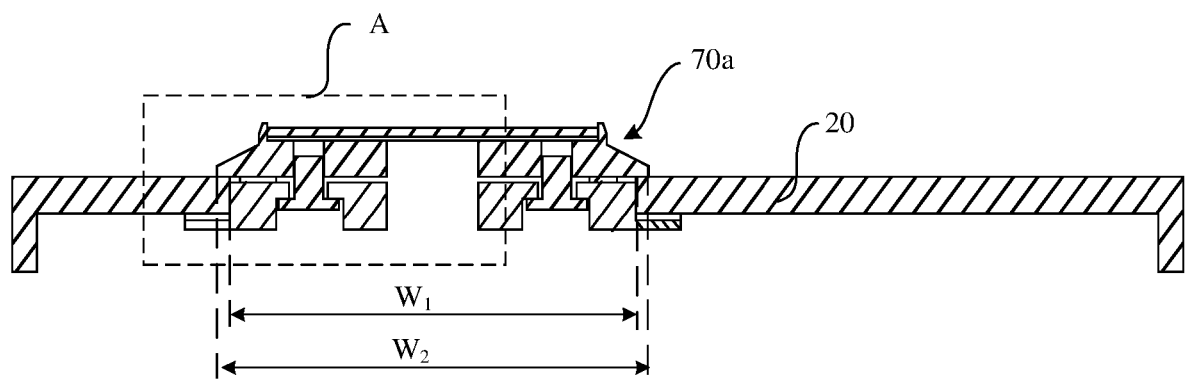
Figure 3A:
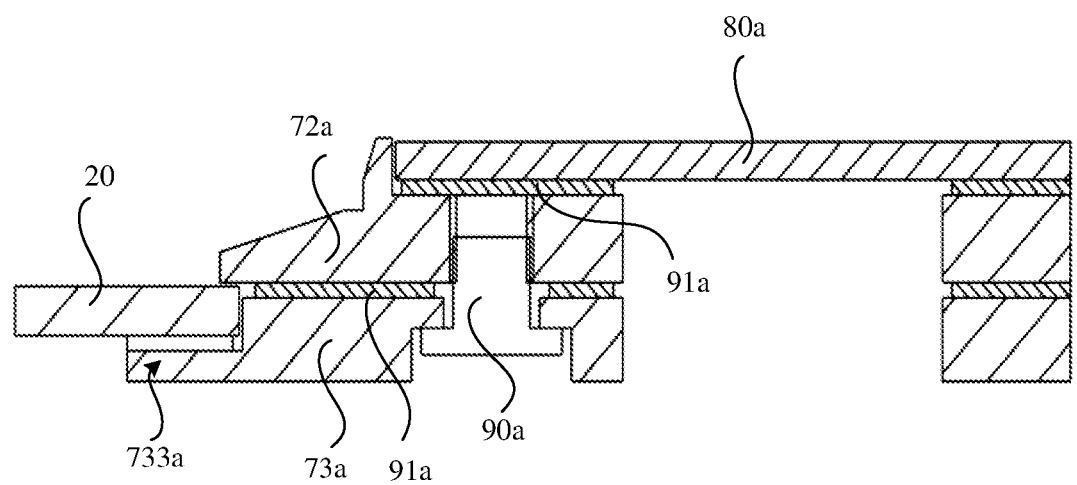
FIG. 3a is an enlarged schematic structural diagram of part A in FIG. 3.

FIG. 3 is a schematic structural diagram showing cross sections of a camera decoration assembly and a rear cover in direction A-A in FIG. 2a. FIG. 3a is an enlarged schematic structural diagram of part A in FIG. 3. Referring to FIG. 3a, the camera decoration assembly 70a includes a first decoration part 72a and a second decoration part 73a. The first decoration part 72a is disposed on an outer side of the rear cover 20. An upper end surface of the first decoration part 72a is provided with a light-transmitting sheet 80a. The second decoration part 73a is disposed below the first decoration part 72a. For example, as shown in FIG. 3a, a part of the second decoration part 73a is disposed in the opening 21 (referring to FIG. 2), and another part of the second decoration part 73a is disposed on an inner side of the rear cover 20. The second decoration part 73a is provided with a hanging table 733a. The hanging table 733a is in sealed connection with the rear cover 20. The first decoration part 72a and the second decoration part 73a are connected and sealed to each other through a connecting piece 90a and a binder 91a.

It can be learned that because the first decoration part 72a may be completely disposed on the outer side of the rear cover 20, a size $W_1$ of the opening 21 in the rear cover 20 may be less than an outline dimension $W_2$ (as shown in FIG. 3) of the camera decoration assembly 70a. However, only an appearance surface of the first decoration part 72a is disposed on the outer side of the rear cover 20 (that is, the first decoration part 72a is exposed, but the second decoration part 73a is not exposed); and generally, the first decoration part 72a is made of a single material or has a single color. This limits appearance diversity of the camera decoration assembly 70a, and goes against diverse design for decorating a camera on the rear cover 20. In addition, the first decoration part 72a and the second decoration part 73a are connected to each other through a screw (namely, the connecting piece 90a). However, the screw can be generally arranged only in a thick enough area of the camera decoration assembly 70a, but is hard to be arranged in a relatively thin area of the camera decoration assembly 70a (for example, areas, near the rear cover 20, of the first decoration part 72a and the second decoration part 73a). As a result, stability of combination between the camera decoration assembly 70a and the rear cover 20 is weak, causing looseness of the camera decoration assembly 70a.

Figure 4:
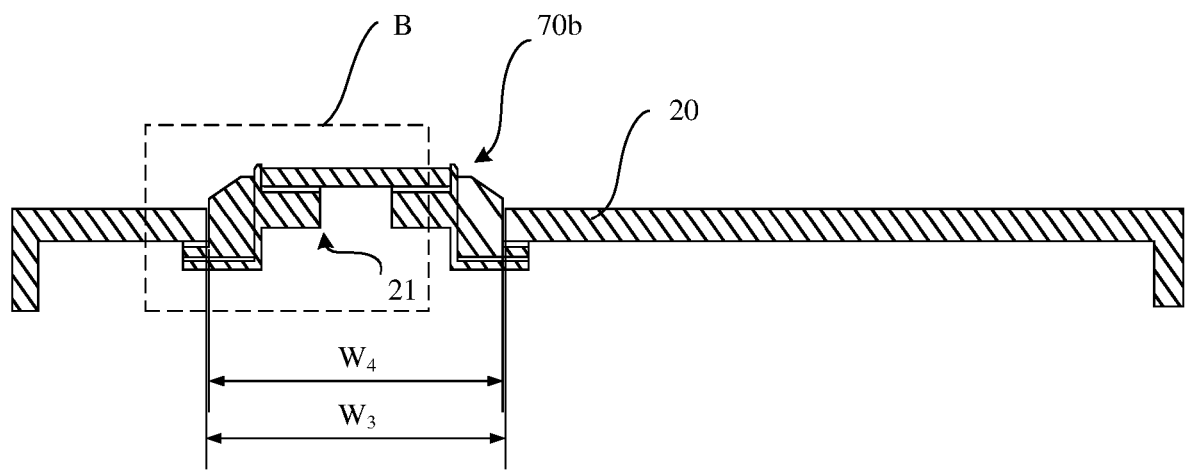
FIG. 4 is a schematic structural diagram showing matching between a camera decoration assembly and a rear cover.
Figure 4A:
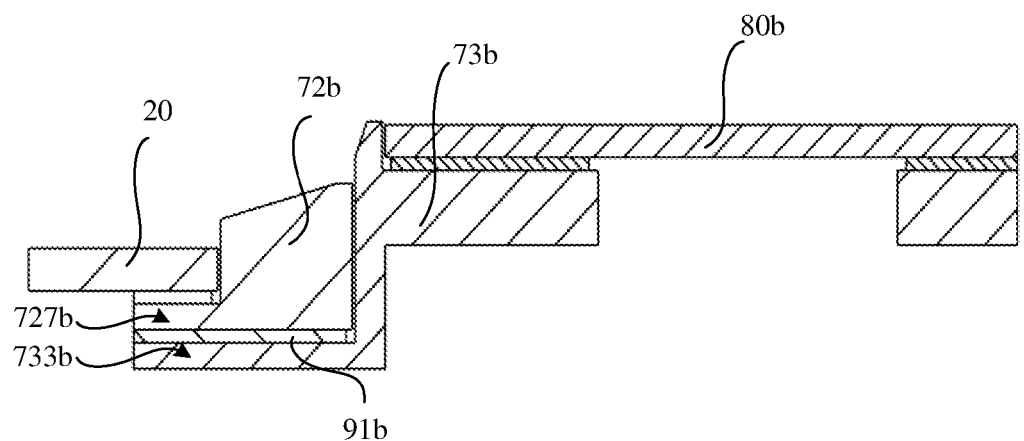
FIG. 4a is an enlarged schematic structural diagram of part B in FIG. 4.

FIG. 4 is a schematic structural diagram showing matching between a camera decoration assembly and a rear cover. FIG. 4a is an enlarged schematic structural diagram of part B in FIG. 4. Referring to FIG. 4a, the camera decoration assembly 70b includes a first decoration part 72b and a second decoration part 73b. An upper end surface of the first decoration part 72b is provided with light-transmitting sheet 80b. The first decoration part 72b is provided with a hanging table 727b. The second decoration part 73b is provided with a hanging table 733b. An upper surface and a lower surface of the hanging table 727b are respectively in sealed connection with an inner surface of the rear cover 20 and an upper surface of the hanging table 733b through a binder 91b. The first decoration part 72b sleeves the second decoration part 73b. From the perspective of a visual effect, both the first decoration part 72b and the second decoration part 73b are exposed. The first decoration part 72b and the second decoration part 73b may be made of different materials, and have different colors, patterns, and the like, thereby achieving different appearance effects.

However, referring to FIG. 4, a size $W_3$ of the opening 21 in the rear cover 20 needs to be greater than an outline dimension $W_4$ of the camera decoration assembly 70b. In this case, strength of the rear cover 20 is weaken accordingly. In addition, connection among the first decoration part 72b, the second decoration part 73b, and the rear cover 20 is implemented in a manner of laminating and bonding the rear cover 20, the hanging table 727b, and the hanging table 733b. This manner still imposes a relatively high requirement for internal space of the rear cover 20, which limits minimization and thinning of an overall dimension of the electronic device 100.

Embodiment 1

Figure 5:
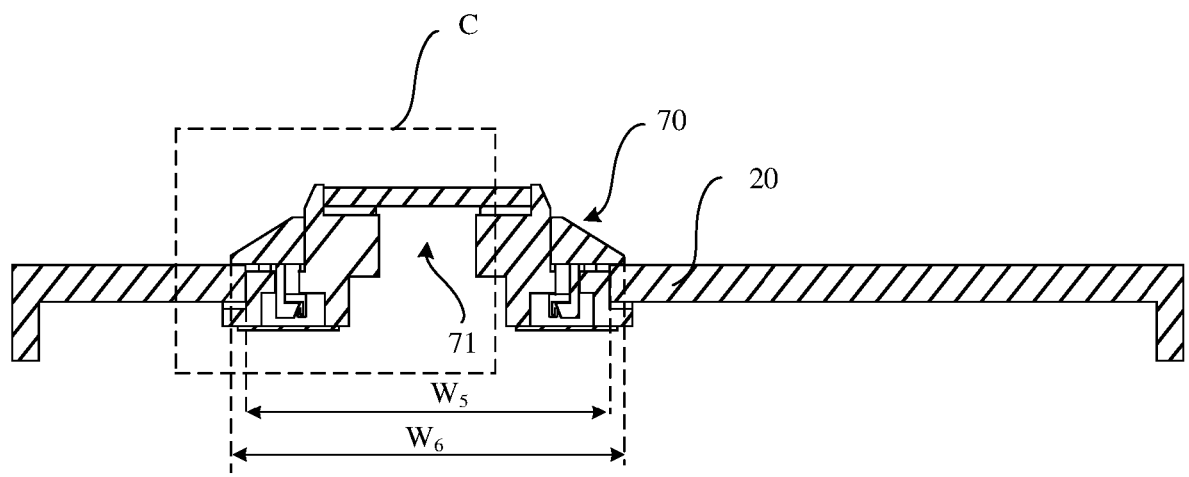
FIG. 5 is a schematic diagram showing matching between a camera decoration assembly and a rear cover according to an embodiment of the present application.
Figure 5A:
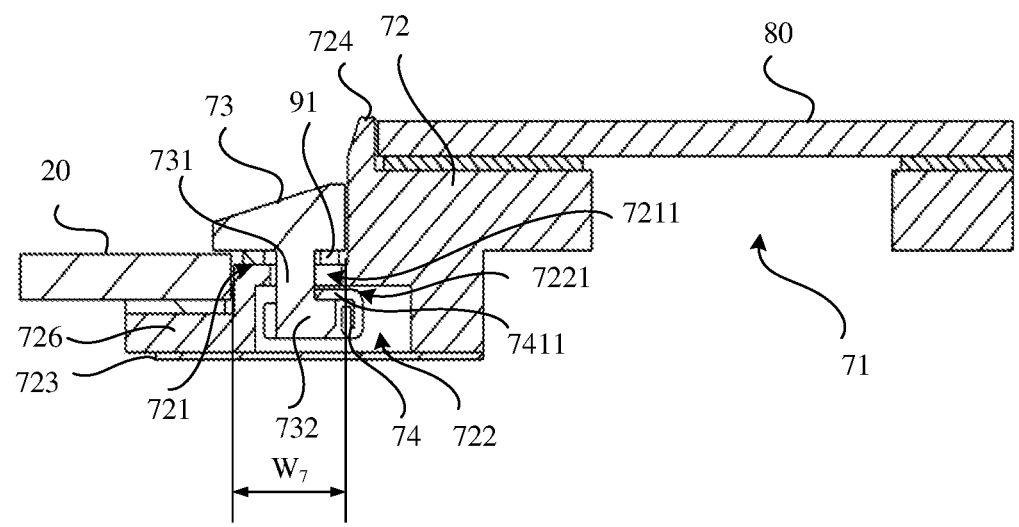
FIG. 5a is an enlarged schematic structural diagram of part C in FIG. 5.
Figure 5B:
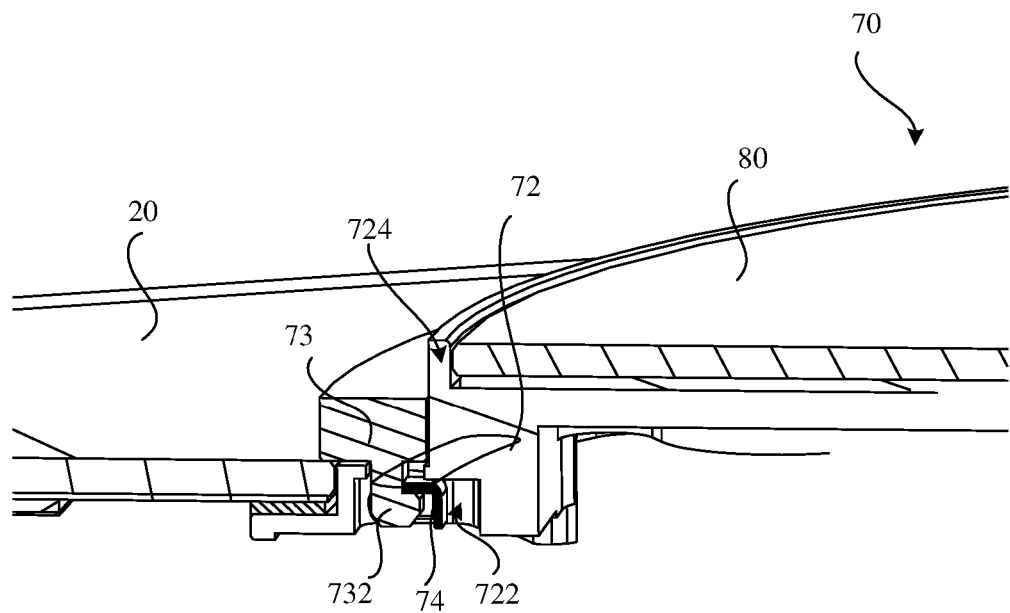
FIG. 5b is a schematic structural diagram showing part of matching between a camera decoration assembly and a rear cover according to an embodiment of the present application.

To resolve the above problems, FIG. 5 is a schematic diagram showing matching between a camera decoration assembly and a rear cover according to an embodiment of the present application; FIG. 5a is an enlarged schematic structural diagram of part C in FIG. 5; and FIG. 5b is a schematic structural diagram showing part of matching between a camera decoration assembly and a rear cover according to an embodiment of the present application. Referring to FIG. 5 and FIG. 5a, in the embodiments of the present application, the electronic device 100 further includes a camera decoration assembly 70. The camera decoration assembly 70 penetrates the opening 21 (referring to FIG. 2) formed in the rear cover 20.

The camera decoration assembly 70 is provided with a photographing hole 71 allowing the camera module 60 to perform photographing. The camera module 60 is disposed near the camera decoration assembly 70. For example, the lens of the camera module 60 is fixedly or telescopically disposed in the photographing hole 71; or the lens of the camera module 60 is disposed in the rear cover 20 of the electronic device 100 and does not extend into the photographing hole 71 when the lens is in a standby state, and can extend into the photographing hole 71 when the lens is in a working state.

Still referring to FIG. 5a and FIG. 5b, The camera decoration assembly 70 may include a first decoration part 72, a second decoration part 73, and at least one connection assembly 74 configured to connect the first decoration part 72 to the second decoration part 73.

During assembly, a first end of the first decoration part 72 penetrates the opening 21 (referring to FIG. 2 and a range denoted by $W_5$ in FIG. 5) and is disposed outside the rear cover 20. A second end of the first decoration part 72 is disposed in the rear cover 20 and is in sealed connection with the inner surface of the rear cover 20.

For example, in FIG. 5a, the rear cover 20 is used for reference. An upper part of the rear cover 20 is defined as an exterior of the rear cover 20; and a lower part of the rear cover 20 is defined as an interior of the rear cover 20.

The second decoration part 73 sleeves an outer side surface at an end, outside the rear cover 20, of the first decoration part 72; and an outer edge of the second decoration part 73 extends to an outer surface of the rear cover 20. When there are a plurality of connection assemblies 74, the connection assemblies 74 (for example, four connection assemblies or five connection assemblies) may be disposed at a periphery of the first decoration part 72, thereby enhancing connection between the second decoration part 73 and the first decoration part 72. In addition, the first decoration part 72 and the second decoration part 73 may be made of different materials, and have different colors, glyphs, patterns, and the like, thereby enriching an appearance effect of the camera decoration assembly 70, and increasing overall aesthetics of the electronic device. Certainly, in some examples, the first decoration part 72 and the second decoration part 73 may have a same color and a same pattern.

It should be understood that when the second decoration part 73 sleeves the first decoration part 72, and the outer edge of the second decoration part 73 may extend to the outer surface of the rear cover 20, such that the outline dimension $W_5$ of the opening 21 formed in the rear cover 20 can be less than an outline dimension $W_6$ (as shown in FIG. 5) of the camera decoration assembly 70, thereby enhancing overall strength of the rear cover 20. In addition, when the outer edge of the second decoration part 73 extends to the outer surface of the rear cover 20, an assembling junction between the camera decoration assembly 70 and the opening 21 in the rear cover 20 can be hidden, thereby avoiding an impact on an appearance of the rear cover 20 caused by exposure of assembling locations, in the opening 21, of the rear cover 20 and the camera decoration assembly 70. A gap between the camera decoration assembly 70 and the rear cover 20 is hidden in appearance, for example, a gap, outside the housing, between first decoration part 72b and the rear cover 20 in FIG. 4a, thereby preventing accumulation of dust and increasing overall exquisiteness of the electronic device.

In addition, the camera decoration assembly 70 provided in the present application has a simple structure, occupies less space, and is more flexible to disassemble.

It should be noted that, in some embodiments of the present application, the second decoration part 73 may be disassembled into a plurality of circular decoration parts. The circular decoration parts sequentially sleeve an outer side surface at an end, outside the rear cover 20, of the first decoration part 72 in circles one by one. In addition, an outer edge of a circular decoration part in the outermost circle extends to the outer surface of the rear cover 20.

In some embodiments of the present application, a top surface of the second decoration part 73, namely, a surface, facing the exterior of the rear cover 20, of the second decoration part 73 may be an inclined surface (as shown in FIG. 5a) inclined to the rear cover 20. In this way, the appearance effect of the camera decoration assembly 70 can be enriched; user's touch feeling can be enhanced; and user's experience effect can be improved.

Certainly, in some embodiments of the present application, the top surface of the second decoration part 73 may be a plane (as shown in FIG. 5b) extending towards the rear cover 20, that is, a surface, away from the interior of the rear cover 20, of the second decoration part 73 is parallel to the outer surface of the rear cover 20. A shape of the top surface of the second decoration part 73 is not limited herein.

Still referring to FIG. 5a, in some embodiments of the present application, an outer surface, between the first end outside the rear cover 20 and the second end inside the rear cover 20, of the first decoration part 72 may be provided with a first step 721, to facilitate disassembly of the camera decoration assembly 70, improve flexibility in disassembling the camera decoration assembly 70, and increase structural stability of the camera decoration assembly 70. The first step 721 is disposed in the opening 21 and configured to support part of the second decoration part 73. The part of the second decoration part 73 is disposed on and connected to the first step 721, thereby guaranteeing stability of the second decoration part 7.

The part of the second decoration part 73 is connected to the first step 721 through at least one connection assembly 74. For example, in some embodiments of the present application, the connection assembly 74 is a screw (not shown in the figure). A through hole 7211 may be formed in the first step 721. A threaded hole (not shown in the figure) may be formed, corresponding to the through hole 7211, in the second decoration part 73. During assembly, the screw penetrates the through hole 7211 from the interior of the rear cover 20 and is connected to the threaded hole, thereby implementing connection between the first decoration part 72 and the second decoration part 73.

For another example, in some embodiments of the present application, referring to FIG. 5a, a surface, facing the first step 721, of the second decoration part 73 is provided with an extension section 731. An end of the extension section 731 is provided with a buckle 732. A through hole 7211 allowing the extension section 731 and the buckle 732 to penetrate is formed in the first step 721. Connection between the first decoration part 72 and the second decoration part 73 is implemented via locking between the connection assembly 74 and the buckle 732.

A binder 91 may be disposed between a hole wall of the through hole 7211 and the extension section 731, thereby implementing a function of preventing water and dust.

Referring to FIG. 5a, in some embodiments of the present application, a surface (namely, a bottom surface of the first decoration part 72), facing the interior of the rear cover 20, of the first decoration part 72 may be further provided with a buckle cavity 722, to prevent components such as the buckle 732 and the connection assembly 74 from interfering with an internal structure of the electronic device 100. The buckle cavity 722 may be an accommodation cavity formed in an end surface, inside the rear cover 20, of the first decoration part 72. In addition, the buckle cavity 722 is communicated with the through hole 7211. The buckle cavity 722 may encircle the components such as the buckle 732 and the connection assembly 74. In this case, a locking groove 7221 used for locking a pin 7411 of the connection assembly 74 is formed in a gap between the buckle 732 and an inner wall of the buckle cavity 722. The pin 7411 can be inserted into the locking groove 7221. Owing to the buckle cavity 722, the connection assembly 74 and the buckle 732 do not occupy internal space of the electronic device. Therefore, the connection assembly 74 and the buckle 732 do not interfere with an internal device of the electronic device.

Referring to FIG. 5a, in a possible implementation of the present application, the electronic device 100 may further include a sealing cover 723. The sealing cover 723 covers and seals an opening, facing the interior of the rear cover 20, of the buckle cavity 722, thereby preventing liquid and dust from entering the electronic device 100 through the through hole 7211, and implementing the function of preventing dust and water.

When the electronic device 100 has a higher requirement for dust prevention and water prevention, the buckle cavity 722 may be further filled with a sealing glue. In addition, filling with the sealing glue can also reinforce a structure of the camera decoration assembly 70.

As a manner of sealed connection between the first decoration part 72 and the rear cover 20, a second step 726 may be disposed at the second end of the first decoration part 72, namely, the end in the rear cover 20. A surface, facing the first end of the first decoration part 72, of the second step 726 is in sealed connection with the inner surface of the rear cover 20. As shown in FIG. 5a, an upper surface of the second step 726 is in sealed connection with a lower surface of the rear cover 20. A manner of the sealed connection may be using a binder to bond the second step with the rear cover 20, thereby guaranteeing dust-proof and water-proof performance.

It is easily understood that when the camera decoration assembly 70 is in sealed connection with the rear cover 20 in the above manner, a dimension, inside the rear cover 20, of the camera decoration assembly 70 is a thickness of the second step 726, such that the camera decoration assembly 70 occupies less internal space of the rear cover 20. Therefore, the electronic device 100 can develop in a minimizing and thinning trend. Moreover, the camera decoration assembly 70 includes a first decoration part 72 and a second decoration part 73. The first decoration part 72 may adopt a built-in scheme shown in FIG. 5a, and may be connected to an inner side surface of the rear cover 20 from the interior of the rear cover 20 through the second step 726. The second decoration part 73 may adopt a built-out scheme shown in FIG. 5c, and may be connected to the first decoration part 72 after penetrating the through hole 7211 from the exterior of the rear cover 20, such that a width (for example, a range denoted by $W_7$ in FIG. 5a) of a matching surface between the first decoration part 72 and the second decoration part 73 in limited mounting space is small. When the first decoration part 72 and the second decoration part 73 respectively adopt the built-in scheme and the built-out scheme, an area of an assembling and matching surface between the second decoration part 73 and the first step 721 of the first decoration part 72 can be relatively small, which facilitates minimization of the opening 21 to enhance the overall strength of the rear cover 20.

In addition, the binder 91 may be further disposed between the second decoration part 73 and an outer side surface at an end, outside the rear cover 20, of the first decoration part 72, between the second decoration part 73 and the second step 726, and between the through hole 7211 and the extension section 731, to enhance tightness of the camera decoration assembly 70 while further guaranteeing dust-proof and water-proof performance of the camera decoration assembly 70.

Figure 5C:
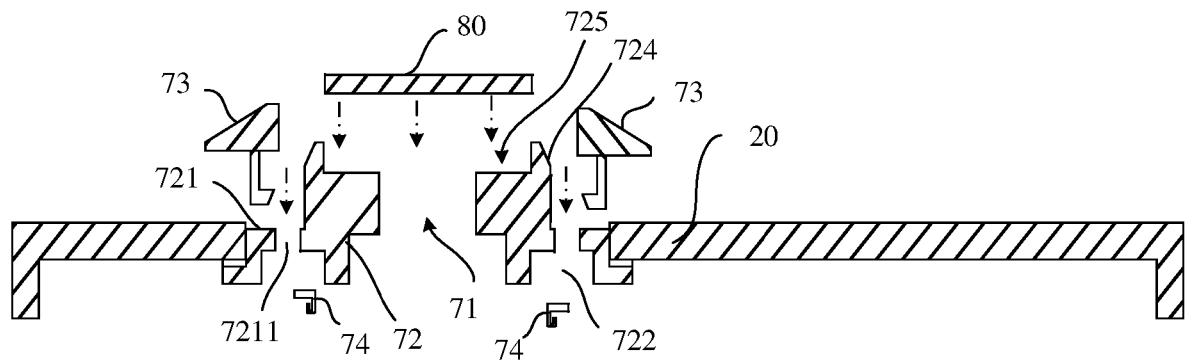
FIG. 5c is a schematic diagram of disassembling the camera decoration assembly and the rear cover shown in FIG. 5.

Still referring to FIG. 5a, in this embodiment of the present application, the electronic device 100 may further include a light-transmitting sheet 80. The light-transmitting sheet 80 is disposed on a top surface of the first decoration part 72, namely, an end surface, facing the exterior of the rear cover 20, of the first decoration part 72. Referring to FIG. 5c, a periphery on the top surface of the first decoration part 72 may be provided with a convex edge 724, to enhance assembling stability of the light-transmitting sheet 80. The convex edge 724 and the top surface of the first decoration part 72 define a mounting cavity 725. The light-transmitting sheet 80 is disposed in the mounting cavity 725, and can be in sealed connection with the top surface of the first decoration part 72 by using the binder 91.

Figure 6:
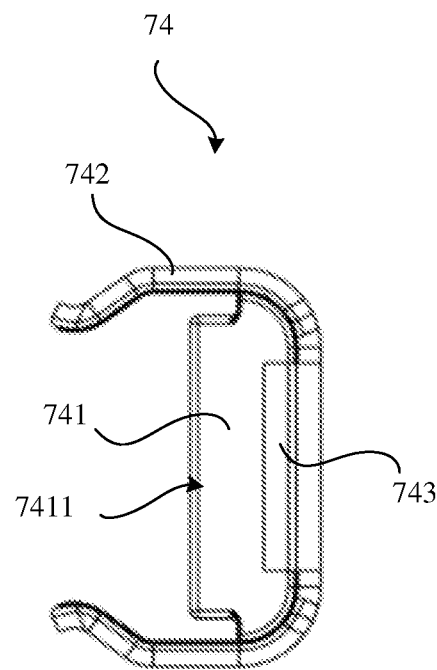
FIG. 6 is a schematic structural diagram of a connection assembly according to an embodiment of the present application.
Figure 7:
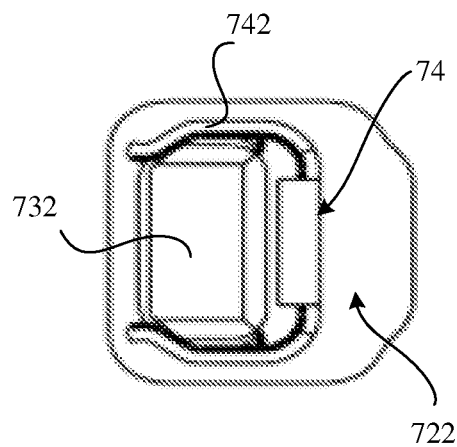
FIG. 7 is an internal view of a buckle cavity according to an embodiment of the present application.

FIG. 6 is a schematic structural diagram of a connection assembly according to an embodiment of the present application. Referring to FIG. 5a and FIG. 6, the connection assembly 74 may include a locking structure 741. An outer diameter of the locking structure 741 is greater than an aperture of the through hole 7211. An end of the locking structure 741 is provided with a pin 7411. The pin 7411 is configured to be locked to the buckle 732. Specifically, referring to FIG. 5a, when the buckle 732 penetrates the through hole 7211, there is a certain gap between the buckle 732 and a lower surface of the first step 721. When the pin 7411 is inserted into the gap, stability of the second decoration part 73 is guaranteed to prevent the second decoration part 73 from getting loose, and the extension section 731 is prevented from being pulled out of the through hole 7211. Therefore, tightness of the second decoration part 73 is guaranteed.

Figure 8:
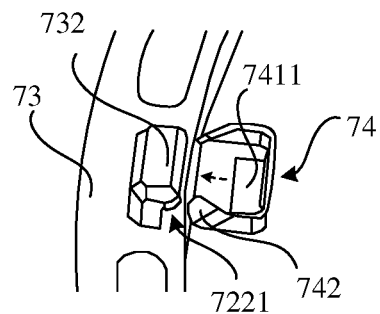
FIG. 8 is a schematic diagram of assembling a connection assembly and a second decoration part according to an embodiment of the present application.
Figure 9:
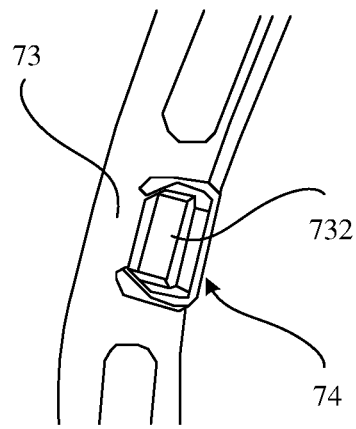
FIG. 9 is a schematic diagram showing matching between a connection assembly and a second decoration part according to an embodiment of the present application.
Figure 10:
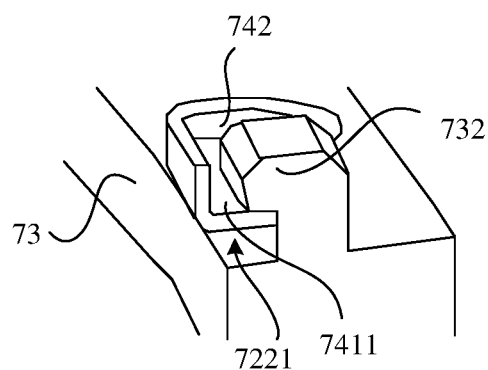
FIG. 10 is a sectional view showing matching between a connection assembly and a second decoration part according to an embodiment of the present application.

Still referring to FIG. 6, in some embodiments of the present application, the connection assembly 74 may further include fixing structures 742. The fixing structures 742 are configured to clamp the connection assembly 74 on the buckle 732, thereby guaranteeing stability of the second decoration part 73. For example, as shown in FIG. 6, the fixing structures 742 are respectively disposed at two ends of the locking structure 741, thereby forming a hooping structure. Referring to FIG. 7 to FIG. 10, FIG. 7 is an internal view of a buckle cavity according to an embodiment of the present application; FIG. 8 is a schematic diagram of assembling a connection assembly and a second decoration part according to an embodiment of the present application; FIG. 9 is a schematic diagram showing matching between a connection assembly and a second decoration part according to an embodiment of the present application; and FIG. 10 is a sectional view showing matching between a connection assembly and a second decoration part according to an embodiment of the present application. The fixing structures 742 hoop the buckle 732, such that the connection assembly 74 is clamped on the buckle 732, and the connection assembly 74 and the buckle 732 are prevented from getting loose.

Figure 11:
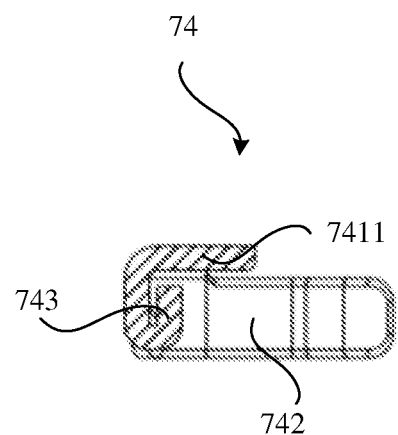
FIG. 11 is a sectional view of a connection assembly according to an embodiment of the present application.

FIG. 11 is a sectional view of a connection assembly according to an embodiment of the present application. Referring to FIG. 11, the connection assembly 74 may be further provided with a reinforcing rib 743, to reinforce a structure of the connection assembly 74.

Embodiment 2

Figure 12:
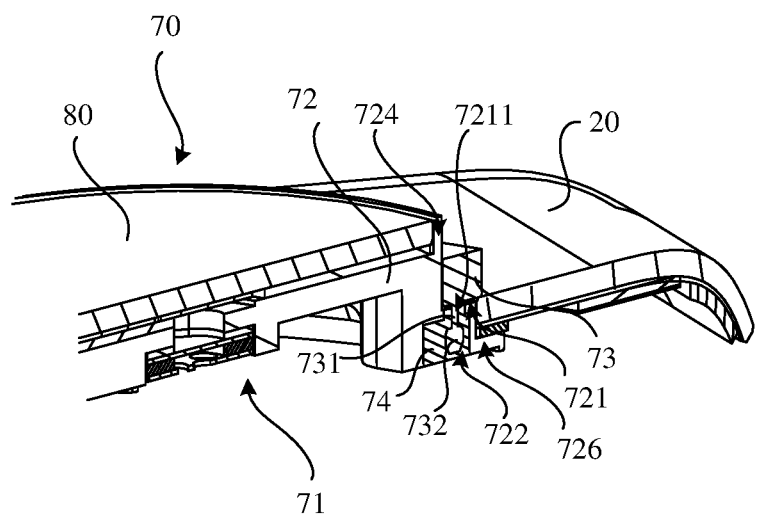
FIG. 12 is a schematic structural diagram showing part of matching between a camera decoration assembly and a rear cover according to an embodiment of the present application.

FIG. 12 is a schematic structural diagram showing part of matching between a camera decoration assembly and a rear cover according to an embodiment of the present application. Referring to FIG. 12, in this embodiment of the present application, the electronic device 100 further includes a camera decoration assembly 70. The camera decoration assembly 70 penetrates the opening 21 (referring to FIG. 2) formed in the rear cover 20.

The camera decoration assembly 70 is provided with a photographing hole 71 allowing the camera module 60 to perform photographing. The camera module 60 is disposed near the camera decoration assembly 70. For example, the lens of the camera module 60 is fixedly or telescopically disposed in the photographing hole 71; or the lens of the camera module 60 is disposed in the rear cover 20 of the electronic device 100 and does not extend into the photographing hole 71 when the lens is in a standby state, and can extend into the photographing hole 71 when the lens is in a working state.

Still referring to FIG. 12, the camera decoration assembly 70 may include a first decoration part 72, a second decoration part 73, and at least one connection assembly 74 configured to connect the first decoration part 72 to the second decoration part 73.

During assembly, a first end of the first decoration part 72 penetrates the opening 21 (referring to FIG. 2 and a range denoted by $W_5$ in FIG. 5) and is disposed outside the rear cover 20. A second end of the first decoration part 72 is disposed in the rear cover 20 and is in sealed connection with the inner surface of the rear cover 20.

For example, in FIG. 12, the rear cover 20 is used for reference. An upper part of the rear cover 20 is defined as an exterior of the rear cover 20; and a lower part of the rear cover 20 is defined as an interior of the rear cover 20.

The second decoration part 73 sleeves an outer side surface at an end, outside the rear cover 20, of the first decoration part 72; and an outer edge of the second decoration part 73 extends to an outer surface of the rear cover 20. When there are a plurality of connection assemblies 74, the connection assemblies 74 (for example, four connection assemblies or five connection assemblies) may be disposed at a periphery of the first decoration part 72, thereby enhancing connection between the second decoration part 73 and the first decoration part 72. In addition, the first decoration part 72 and the second decoration part 73 may be made of different materials, and have different colors, glyphs, patterns, and the like, thereby enriching an appearance effect of the camera decoration assembly 70, and increasing overall aesthetics of the electronic device. Certainly, in some examples, the first decoration part 72 and the second decoration part 73 may have a same color and a same pattern.

It should be understood that when the second decoration part 73 sleeves the first decoration part 72, and the outer edge of the second decoration part 73 may extend to the outer surface of the rear cover 20, such that the outline dimension of the opening 21 formed in the rear cover 20 can be less than the outline dimension (for a principle, refer to FIG. 5 of embodiment 1) of the camera decoration assembly 70, thereby enhancing overall strength of the rear cover 20. In addition, when the outer edge of the second decoration part 73 extends to the outer surface of the rear cover 20, an assembling junction between the camera decoration assembly 70 and the opening 21 in the rear cover 20 can be hidden, thereby avoiding an impact on an appearance of the rear cover 20 caused by exposure of assembling locations, in the opening 21, of the rear cover 20 and the camera decoration assembly 70. A gap between the camera decoration assembly 70 and the rear cover 20 is hidden in appearance, for example, a gap, outside the housing, between first decoration part 72b and the rear cover 20 in FIG. 4a, thereby preventing accumulation of dust and increasing overall exquisiteness of the electronic device.

In addition, the camera decoration assembly 70 provided in the present application has a simple structure, occupies less space, and is more flexible to disassemble.

It should be noted that, in some embodiments of the present application, the second decoration part 73 may be disassembled into a plurality of circular decoration parts. The circular decoration parts sequentially sleeve an outer side surface at an end, outside the rear cover 20, of the first decoration part 72 in circles one by one. In addition, an outer edge of a circular decoration part in the outermost circle extends to the outer surface of the rear cover 20.

In some embodiments of the present application, a top surface of the second decoration part 73, namely, a surface, facing the exterior of the rear cover 20, of the second decoration part 73 may be a plane (as shown in FIG. 12) extending towards the rear cover 20. Certainly, the surface may alternatively be an inclined surface inclined to the rear cover 20. In this way, the appearance effect of the camera decoration assembly 70 can be enriched; user's touch feeling can be enhanced; and user's experience effect can be improved.

Still referring to FIG. 12, in some embodiments of the present application, an outer surface, between the first end outside the rear cover 20 and the second end inside the rear cover 20, of the first decoration part 72 may be provided with a first step 721, to facilitate disassembly of the camera decoration assembly 70, improve flexibility in disassembling the camera decoration assembly 70, and increase structural stability of the camera decoration assembly 70. The first step 721 is disposed in the opening 21 and configured to support part of the second decoration part 73. The part of the second decoration part 73 is disposed on and connected to the first step 721, thereby guaranteeing stability of the second decoration part 7.

In some embodiments of the present application, a surface, facing the first step 721, of the second decoration part 73 is provided with an extension section 731. An end of the extension section 731 is provided with a buckle 732. A through hole 7211 allowing the extension section 731 and the buckle 732 to penetrate is formed in the first step 721.

An end surface, inside the rear cover 20, of the first decoration part 72 is provided with a buckle cavity 722. The buckle cavity 722 is communicated with the through hole 7211. The buckle 732 is disposed in the buckle cavity 722. The connection assembly 74 is configured to connect to at least the buckle 732, thereby connecting the second decoration part 73 to the first decoration part 72.

The connection assembly 74 may include a sealing glue, which may be understood as that the buckle cavity 722 is filled with the sealing glue, thereby fixing the buckle in the buckle cavity 722. In addition, assembling between the first decoration part 72 and second decoration part 73 may be fixed by dispensing the glue. After the dispensing is completed, curing is performed within specified time.

Figure 13:
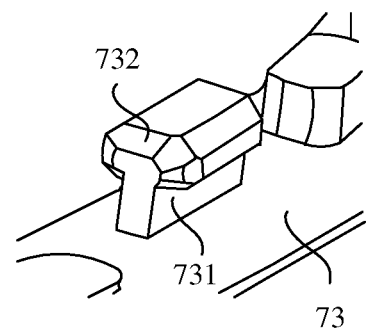
FIG. 13 is a schematic diagram of part of a structure of a second decoration part according to an embodiment of the present application.

FIG. 13 is a schematic diagram of part of a structure of a second decoration part according to an embodiment of the present application. Referring to FIG. 13, in some embodiments of the present application, the buckle 732 may be T-shaped. In this case, drawing force on the second decoration part 73 after the sealing glue is cured can be increased. Certainly, the buckle 732 may alternatively be L-shaped as in embodiment 1, or umbrella-shaped. A shape of the buckle 732 is not limited herein.

Certainly, the electronic device 100 may further include a sealing cover. The sealing cover covers and seals an opening, facing the interior of the rear cover 20, of the buckle cavity 722, thereby preventing liquid and dust from entering the electronic device 100 through the through hole, and implementing a function of preventing dust and water.

As a manner of sealed connection between the first decoration part 72 and the rear cover 20, a second step 726 may be disposed at the second end of the first decoration part 72, namely, the end in the rear cover 20. A surface, facing the first end of the first decoration part 72, of the second step 726 is in sealed connection with the inner surface of the rear cover 20. As shown in FIG. 12, an upper surface of the second step 726 is in sealed connection with a lower surface of the rear cover 20. A manner of the sealed connection may be using a binder to bond the second step with the rear cover 20, thereby guaranteeing dust-proof and water-proof performance.

It is easily understood that when the camera decoration assembly 70 is in sealed connection with the rear cover 20 in the above manner, a dimension, inside the rear cover 20, of the camera decoration assembly 70 is a thickness of the second step 726, such that the camera decoration assembly 70 occupies less internal space of the rear cover 20. Therefore, the electronic device 100 can develop in a minimizing and thinning trend. Moreover, the camera decoration assembly 70 includes a first decoration part 72 and a second decoration part 73. The first decoration part 72 may adopt a built-in scheme shown in FIG. 5a, and may be connected to an inner side surface of the rear cover 20 from the interior of the rear cover 20 through the second step 726. The second decoration part 73 may adopt a built-out scheme shown in FIG. 5c, and may be connected to the first decoration part 72 after penetrating the through hole 7211 from the exterior of the rear cover 20, such that a width (for example, a range denoted by $W_7$ in FIG. 5a) of a matching surface between the first decoration part 72 and the second decoration part 73 in limited mounting space is small. When the first decoration part 72 and the second decoration part 73 respectively adopt the built-in scheme and the built-out scheme, an area of an assembling and matching surface between the second decoration part 73 and the first step 721 of the first decoration part 72 can be relatively small, which facilitates minimization of the opening 21 to enhance the overall strength of the rear cover 20.

In addition, the binder may be further disposed between the second decoration part 73 and an outer side surface at an end, outside the rear cover 20, of the first decoration part 72, between a hole wall of the through hole 7211 and the extension section 731, between the second decoration part 73 and the second step 726, and between the through hole 7211 and the extension section 731, to enhance tightness of the camera decoration assembly 70 while further guaranteeing dust-proof and water-proof performance of the camera decoration assembly 70.

Still referring to FIG. 12, in this embodiment of the present application, the electronic device 100 may further include a light-transmitting sheet 80. The light-transmitting sheet 80 is disposed on a top surface of the first decoration part 72, namely, an end surface, facing the exterior of the rear cover 20, of the first decoration part 72. A periphery on the top surface of the first decoration part 72 may be provided with a convex edge 724, to enhance assembling stability of the light-transmitting sheet 80. The convex edge 724 and the top surface of the first decoration part 72 define a mounting cavity. The light-transmitting sheet 80 is disposed in the mounting cavity, and can be in sealed connection with the top surface of the first decoration part 72 by using the binder.

In conclusion, the electronic device 100 provided in the embodiments of the present application has the following advantage: The size of the opening 21 in the rear cover 20 can be decreased while the camera decoration assembly 70 has diverse appearance effects, thereby guaranteeing overall strength of the rear cover 20. Moreover, a form of connection between the buckle 732 and the connection assembly 74 facilitates disassembly, decreases occupied space, and can increase flexibility in disassembling the camera decoration assembly 70. The camera decoration assembly 70 may also be disassembled from the perspective of appearance. In addition, an overall structure of the camera decoration assembly 70 is simple, such that the camera decoration assembly occupies less internal space of the electronic device 100. This can further minimize and thin the electronic device 100. Moreover, a gap between the camera decoration assembly 70 and the rear cover 20 can be hidden in appearance, thereby preventing accumulation of dust and increasing overall exquisiteness of the electronic device. In the electronic device 100 provided in the embodiments of the present application, structural stability and reliability of the camera decoration assembly 70 can also be enhanced.

In the descriptions of the embodiments of this application, it is to be noted that, unless otherwise specified or defined, the terms such as "mount", "connect", and "connection" should be understood in a broad sense, for example, which may be a fixed connection, an indirect connection through an intermediary, or internal communication between two components or mutual interaction relationship between two components. A person of ordinary skill in the art may understand the specific meanings of the foregoing terms in the embodiments of this application according to specific situations.

In the specification, claims, and accompanying drawings of the embodiments of this application, the terms "first", "second", "third", "fourth", and so on (if existent) are intended to distinguish between similar objects but do not necessarily indicate a specific order or sequence.

Finally, it is to be noted that the foregoing embodiments are merely intended for describing the technical solutions of this application, but are not intended to limit this application. Although this application is described in detail with reference to the foregoing embodiments, it should be appreciated by a person of ordinary skill in the art that, modifications may still be made to the technical solutions recorded in the foregoing embodiments, or equivalent replacements may be made to the part of all of the technical features; and these modifications or replacements will not cause the essence of corresponding technical solutions to depart from the scope of the technical solutions in the embodiments of this application.

What is claimed is:

1. An electronic device, comprising:
   a housing with an opening;
   at least one camera module;
   a camera decoration assembly passing through the opening;
   wherein the camera module is disposed facing the camera decoration assembly;
   wherein the camera decoration assembly comprises a first decoration part, a second decoration part, and at least one connection assembly configured to connect the first decoration part to the second decoration part;
   wherein a first end of the first decoration part passes through the opening and is disposed outside the housing, and a second end of the first decoration part is disposed in the housing and connected to an inner surface of the housing;
   wherein the second decoration part sleeves an outer side surface, outside the housing, of the first decoration part, and an outer edge of the second decoration part extends to an outer surface of the housing;
   wherein an outer surface between the first end and the second end of the first decoration part is provided with a first step, the first step is disposed in the opening, and the second decoration part is partially disposed on and connected to the first step;
   wherein a surface, facing the first step, of the second decoration part is provided with an extension section, an end of the extension section is provided with a buckle, and a through hole allowing the extension section and the buckle to pass through is formed in the first step; and
   wherein the connection assembly is configured to connect to at least the buckle, thereby connecting the second decoration part to the first decoration part.

2. The electronic device of claim 1, wherein an end surface, in the housing, of the first decoration part is provided with a buckle cavity, the buckle cavity is communicated with the through hole, and the buckle is disposed in the buckle cavity.

3. The electronic device of claim 2, wherein the connection assembly comprises a sealing glue; and
wherein the buckle cavity is filled with the sealing glue, and the sealing glue is used to fix the buckle in the buckle cavity.

4. The electronic device of claim 2, wherein the connection assembly comprises a locking structure, an end of the locking structure is provided with a pin, a locking groove is formed between the buckle and an inner wall of the buckle cavity, and the pin is disposed in the locking groove.

5. The electronic device of claim 3, wherein the connection assembly comprises a locking structure, an end of the locking structure is provided with a pin, a locking groove is formed between the buckle and an inner wall of the buckle cavity, and the pin is disposed in the locking groove.

6. The electronic device of claim 4, wherein the connection assembly further comprises fixing structures, and the fixing structures are respectively disposed at two ends of the locking structure and are used to clamp the buckle.

7. The electronic device of claim 5, wherein the connection assembly further comprises fixing structures, and the fixing structures are respectively disposed at two ends of the locking structure and are used to clamp the buckle.

8. The electronic device of claim 2, further comprising: a sealing cover, wherein the sealing cover covers and seals an opening, facing an interior of the housing, of the buckle cavity.

9. The electronic device of claim 4, wherein the connection assembly is provided with a reinforcing rib.

10. The electronic device of claim 1, wherein the second end of the first decoration part is provided with a second step, and a surface, facing the first end of the first decoration part, of the second step is in sealed connection with the housing.

11. The electronic device of claim 1, wherein a binder is disposed between the second decoration part and the first step; and
wherein the binder is also disposed between the second decoration part and an outer side surface at an end, outside the housing, of the first decoration part.

12. The electronic device of claim 1, further comprising: a light-transmitting sheet, wherein the light-transmitting sheet is disposed on a top surface of the first decoration part.

13. The electronic device of claim 12, wherein a periphery of the top surface of the first decoration part is provided with a convex edge, the convex edge and the top surface of the first decoration part define a mounting cavity, and the mounting cavity is used for mounting of the light-transmitting sheet.

14. The electronic device of claim 1, wherein a surface, away from an interior of the housing, of the second decoration part is an inclined surface inclined to the housing.

15. The electronic device of claim 1, wherein a surface, away from an interior of the housing, of the second decoration part is parallel to the outer surface of the housing.

16. The electronic device of claim 1, wherein the connection assembly comprises a screw; and
wherein the second decoration part is provided with a threaded hole, a through hole is formed in the first step, and the screw passes through the through hole and is connected to the threaded hole.

17. A camera decoration assembly, comprising:
a housing with an opening;
a first decoration part;
a second decoration part; and
at least one connection assembly configured to connect the first decoration part to the second decoration part;
wherein a first end of the first decoration part passes through the opening and is disposed outside the housing, and a second end of the first decoration part is disposed in the housing and connected to an inner surface of the housing;
wherein the second decoration part sleeves an outer side surface, outside the housing, of the first decoration part, and an outer edge of the second decoration part extends to an outer surface of the housing;
wherein an outer surface between the first end and the second end of the first decoration part is provided with a first step, the first step is disposed in the opening, and the second decoration part is partially disposed on and connected to the first step;
wherein a surface, facing the first step, of the second decoration part is provided with an extension section, an end of the extension section is provided with a buckle, and a through hole allowing the extension section and the buckle to pass through is formed in the first step; and
wherein the connection assembly is configured to connect to at least the buckle, thereby connecting the second decoration part to the first decoration part.

18. The camera decoration assembly of claim 17, wherein an end surface, in the housing, of the first decoration part is provided with a buckle cavity, the buckle cavity is communicated with the through hole, and the buckle is disposed in the buckle cavity.

19. The camera decoration assembly of claim 18, wherein the connection assembly comprises a sealing glue; and
wherein the buckle cavity is filled with the sealing glue, and the sealing glue is used to fix the buckle in the buckle cavity.

20. The camera decoration assembly of claim 18, wherein the connection assembly comprises a locking structure, an end of the locking structure is provided with a pin, a locking groove is formed between the buckle and an inner wall of the buckle cavity, and the pin is disposed in the locking groove.

* * * * *